Figure 1:
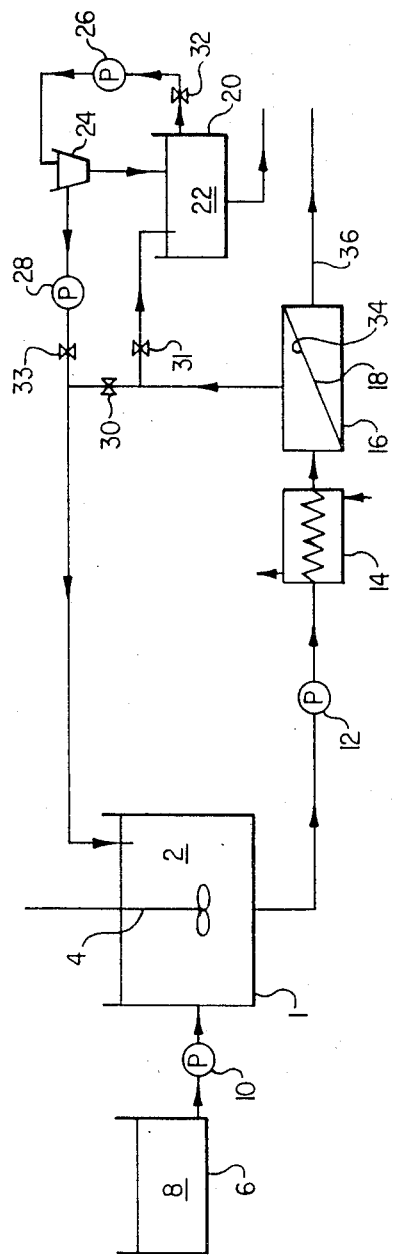

United States Patent [19]

Kutowy et al.

[11] Patent Number: 4,814,088
[45] Date of Patent: Mar. 21, 1989

[54] METHOD FOR THE MOLECULAR FILTRATION OF PREDOMINANTLY ALIPHATIC HYDROCARBON LIQUIDS

[75] Inventors: Oleh Kutowy, North Gower; Thomas A. Tweddle; John D. Hazlett, both of Orleans, all of Canada

[73] Assignee: National Research Council of Canada, Ottawa, Canada

[21] Appl. No.: 221,528

[22] Filed: Jul. 20, 1988

Related U.S. Application Data

[63] Continuation-in-part of Ser. No. 898,146, Aug. 18, 1986, abandoned.

[30] Foreign Application Priority Data

Aug. 28, 1985 [CA] Canada .................................. 489596

[51] Int. Cl.[4] .............................................. B01D 13/00
[52] U.S. Cl. .................................. 210/651; 210/500.41
[58] Field of Search ................ 585/818, 819; 210/639, 210/649, 650, 651, 654, 500.38, 500.41, 500.42, 500.43

[56] References Cited

U.S. PATENT DOCUMENTS 3,990,963 11/1986 Audibert et al. ..................... 210/179
4,617,126 10/1986 Funk et al. ...................... 210/500.41

Primary Examiner—Frank Spear
Attorney, Agent, or Firm—Francis W. Lemon

[57] ABSTRACT

A method for the molecular filtration of predominantly aliphatic hydrocarbon liquids (e.g. spent diesel lubrication oil, crude oil or pipeline blend crude oils and heavy oils, and bitumen), wherein, at a viscosity less than 600 centipoise, the predominantly aliphatic hydrocarbon liquid is passed through a membrane, having at least a swelled outer layer on the high pressure side comprising a microporous, membrane of an aliphatic hydrocarbon liquid swellable, polysulfone compound, at a pressure differential in the range 1 to 100 atmospheres oil. The microporous membrane having been swelled in the aliphatic hydrocarbon liquid from having a molecular weight cut off less of than 20,000 when measured in an aqueous medium to, after adsorption of hydrocarbon liquid and having been swelled thereby, a molecular weight cut off less than 4,000 when measured in hydrocarbon liquid, so that oil depleted in the substance to be filtered therefrom permeates the membrane. The viscosity of the crude oil may be reduced by heating or adding a solvent to it. The invention is useful for separating, for example, nitrogen, sulphur, aluminum, chromium, copper, nickel, vanadium and asphaltenes from fossil derived, predominantly aliphatic hydrocarbon liquids.

4 Claims, 5 Drawing Sheets

U20-20 Separation Profile vs Stokes Radius of Solute.

U20-20 Membrane Fluxes of H$_2$O and Alcohols.

U20-20 Membrane Fluxes for Hydrocarbons.

METHOD FOR THE MOLECULAR FILTRATION OF PREDOMINANTLY ALIPHATIC HYDROCARBON LIQUIDS

This is a continuation-in-part of Ser. No. 898,146 filed Aug. 18, 1986, now abandoned.

This invention relates to a method for the molecular filtration of predominantly aliphatic hydrocarbon liquids.

It has already been proposed in U.S. Pat. No. 4,093,540, dated June 6, 1978, "Purification Process", A. K. S. Gupta, to refine dilute glyceride oil compositions by contacting them, in solution in an organic solvent with a semi-permeable (e.g. polysulphone or polyacrylonitrile) membrane to separate constituents of different molecular weights into retentate and permeate fractions. The removal of, say, phosphatides (lecithins) from, say, a hexane solution of crude vegetable oil by the Gupta process is possible because lecithins, when dissolved in hexane, form molecular aggregates known as micelles with a molecular weight as high as 200,000.

While the Gupta process has been found useful for separating these high molecular weight aggregates, it is not possible to form such high molecular weight aggregates, using hexane, from high molecular weight fractions of, predominantly aliphatic hydrocarbon liquids, or to separate inorganic substances present in predominantly aliphatic hydrocarbon liquids as solutions and suspensions, and so the Gupta process is not useful as a separation process in such instance, unless, as taught by Gupta, these substances (e.g. bitumen, calcium or magnesium) are present chemically associated with the phospholipids which is never the case. This is borne out by the fact that Gupta teaches that metals are not removed by the ultrafiltration step of his process, see, for example, the table in column 10, lines 20–32, where lecithin obtained by ultrafiltration still contains metals that were originally present in the commercial lecithin, and column 11, lines 5–15, where the silica treatment lowers the contents of the metals. In column 11, lines 5–15, the chemical analysis is given for crude oil, which contains large amounts of metals associated with the phospholipids and these are removed with the phospholipids. However, as shown in column 11, lines 5–15, the ultrafiltration step does not remove any of these metals to any greater extent than are removed conventionally during the refining of oil It has already been proposed in U.S. Pat. No. 4,617,126, dated Oct. 14, 1986, "Membrane Separation of Hydrocarbons", E. W. Funk et al, to remove light hydrocarbon solvents from a mixture of light hydrocarbon solvent and deasphalted crude oil by passing the mixture over a polysulfone membrane.

It has also been proposed in U.S. Pat. No. 3,990,963, dated Nov. 9, 1976, "Process for Regenerating Used Lubricating Oils", Francois Audibert et al, to filter used lubricating oils, heated to 200°–500° C., through ultrafiltration membranes of, for example, sulfonated polyarylethersulfones, having a cut zone in the range 5,000 to 300,000.

While the processes of Gupta, Funk et al and Audibert et al have found to been useful, these processes will not, for example, remove solely by ultrafiltration nitrogen, sulphur, aluminum, chromium, copper, nickel, vanadium and asphaltenes present as solutions or suspensions in a retentate from predominantly aliphatic hydrocarbon liquids, providing a permeate depleted in these substances.

There is a need for a method for the molecular filtration of predominantly aliphatic hydrocarbon liquids, and in particular there is a need for an economical process for the removal of nitrogen, aluminum, chromium, copper, sulphur, nickel, vanadium and asphaltenes present as solutions or suspensions from fossil derived, predominantly aliphatic hydrocarbon liquids.

According to the present invention there is provided a method for the molecular filtration of a predominantly aliphatic hydrocarbon liquid, comprising, (a) selecting a membrane having at least an outer layer on the high pressure side thereof in the form of a microporous membrane of an aliphatic hydrocarbon liquid swellable, polysulfone compound, the whole of the membrane having been gelled in an aqueous gelation liquid, the microporous membrane being manufactured and maintained substantially free of any adsorbed aliphatic hydrocarbon liquid and having a molecular weight cut off of less than about 20,000, when measured in an aqueous medium, (b) contacting the outer layer on the high pressure side of the membrane with an aliphatic hydrocarbon liquid until the outer layer has swelled to have a molecular weight cut off of less than about 4,000, when measured in hydrocarbon liquid, then (c) passing the predominantly aliphatic hydrocarbon liquid, at a viscosity of less than about 600 centipoise and at a pressure differential in the range of about one atmosphere to about 100 atmospheres (i.e. 0.1 to 10.0 MPa), across and in contact with the swelled outer layer on the high pressure side of the membrane so that fossil derived, aliphatic hydrocarbon liquid depleted in at least one substance permeates the said membrane, and (d) removing the predominantly aliphatic hydrocarbon liquid permeate, depleted in the said at least one substance, from the membrane.

The aliphatic hydrocarbon liquid of step, (b) may be the predominantly aliphatic hydrocarbon liquid of step (c).

The aliphatic hydrocarbon liquid may be passed across the swelled outer layer of the membrane with the aliphatic hydrocarbon liquid having a viscosity of less than about 400 centipoise, and the membrane may be selected to have at least an outer layer on the high pressure side with a molecular weight cut off of less than about 10,000, when measured in an aqueous medium, prior to being contacted with the aliphatic hydrocarbon liquid.

In some embodiments of the present invention, at least a major portion of at least one substance selected from the group consisting of nitrogen, sulphur, aluminum, chromium, copper, nickel, vanadium and asphaltenes is removed by molecular filtration from the predominantly aliphatic hydrocarbon liquid.

The present invention is particularly useful for removing, for example, asphaltenes from tar sand bitumen in addition to removing inorganic substances therefrom.

Figure 2:
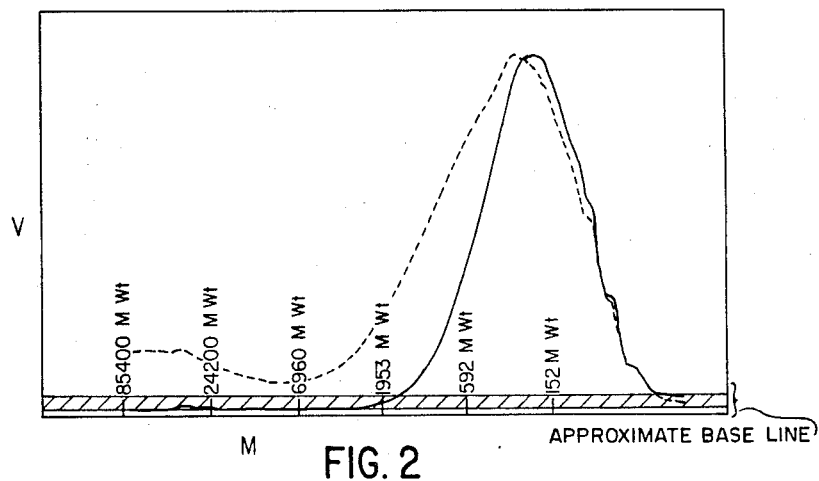
Figure 3:
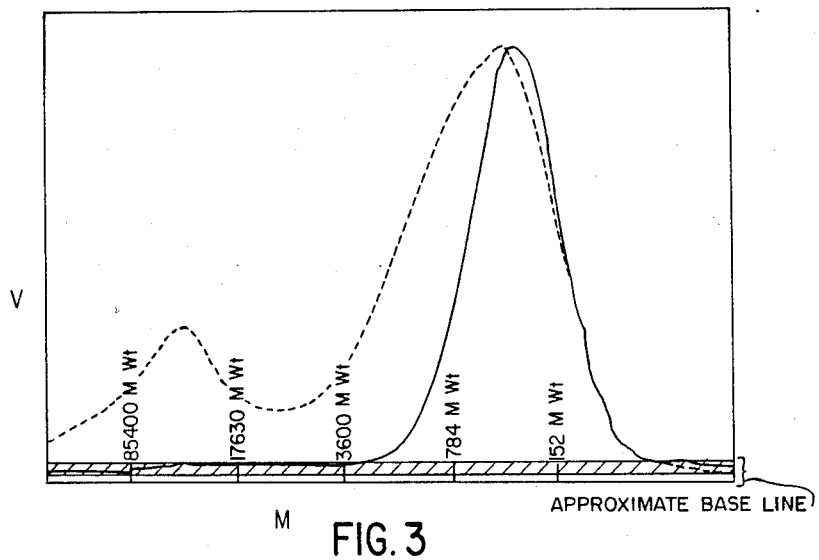
Figure 4:
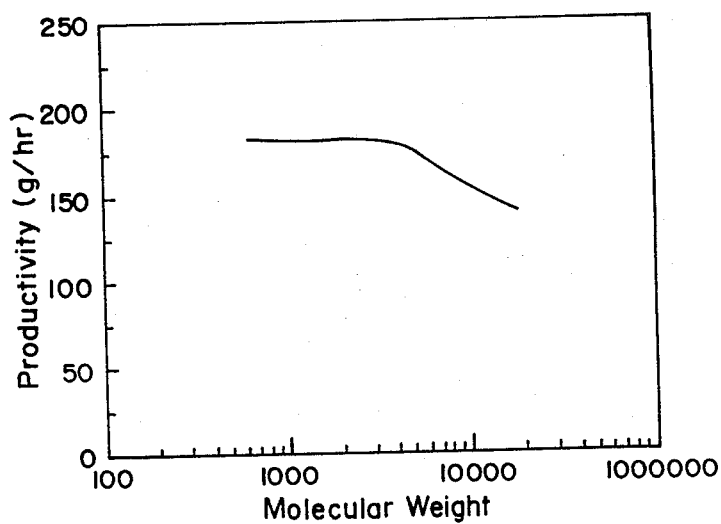
Figure 5:
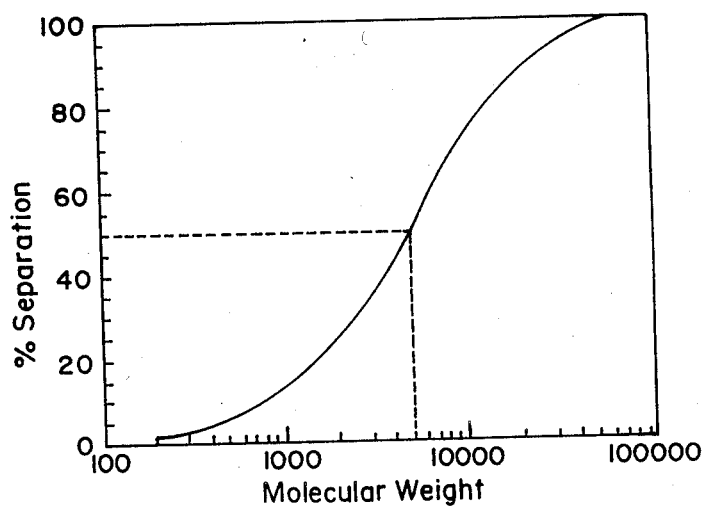
Figure 6:
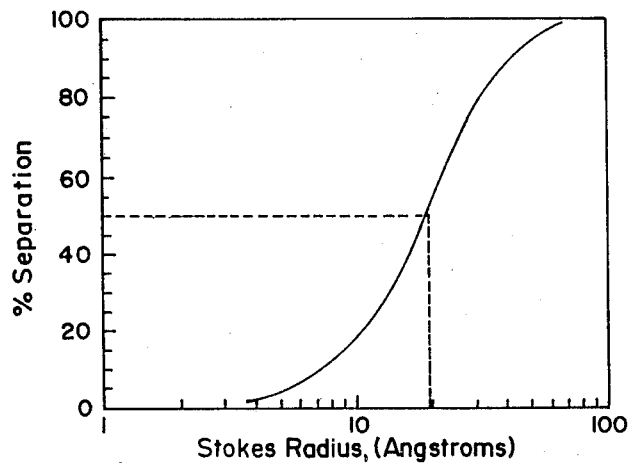
Figure 7:
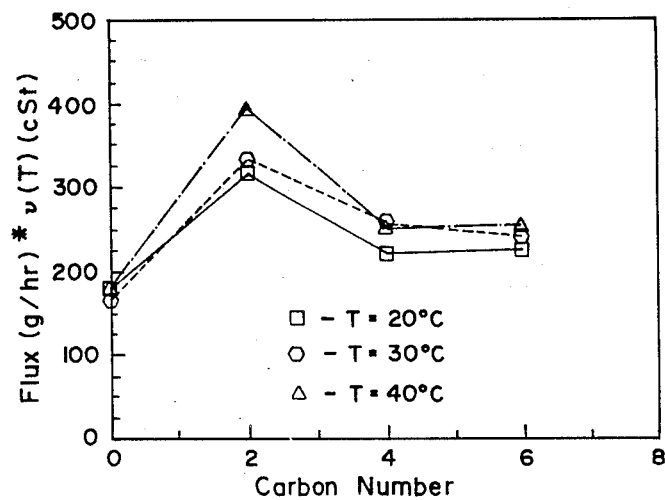
Figure 8:
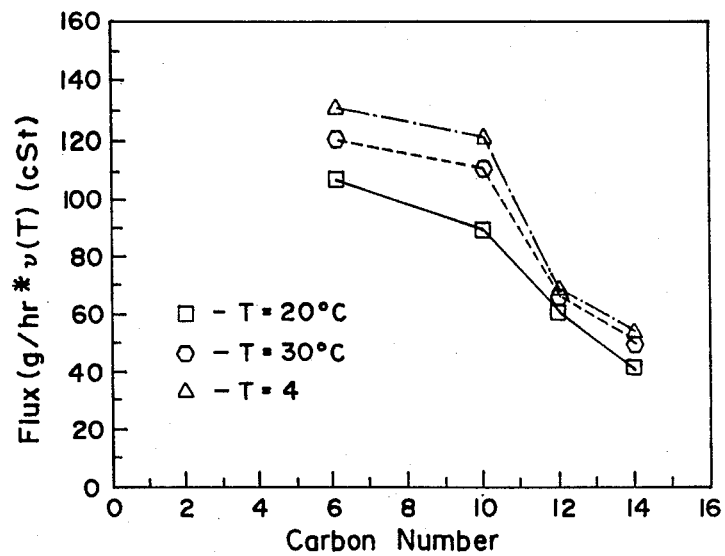
Figure 9:
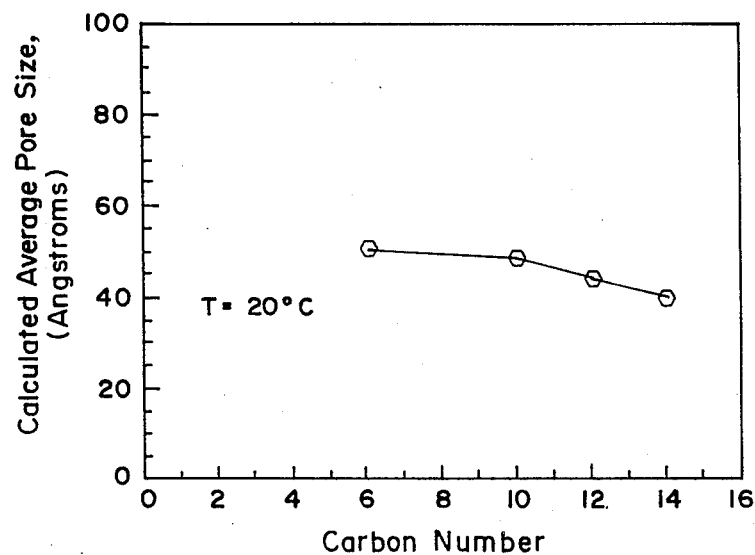

In the accompanying drawings which are provided for a better understanding of the present invention:

FIG. 1 shows a flow diagram of apparatus used to verify the present invention,

FIG. 2 is a graph of the molecular weight distribution of a light oil before and after the separation of inorganic substances therefrom, FIG. 3 is a graph of the molecular weight distribution of a heavy oil before and after the separation of inorganic substances therefrom, FIG. 4 is a graph of the productivity of a membrane plotted against the molecular weight of the solute, FIG. 5 is a graph of the separation plotted against the molecular weight of the solute, FIG. 6 is a graph of the separation plotted against the Stokes radius of the solute, FIG. 7 and 8 are graphs of the product of flux and kinematic viscosity plotted against the carbon number of the liquid, and FIG. 9 is a graph of the calculated average pore size of the membrane plotted against the carbon number of the liquid.

In FIG. 1, there is shown a tank 1, containing predominantly aliphatic hydrocarbon liquid 2, a stirrer 4 in the hydrocarbon liquid 2, a tank 6 containing a solvent 8 for the hydrocarbon liquid 2, pumps 10 and 12, a heat exchanger 14, a membrane separating device 16 having a microporous membrane 18, a tank 20 containing retentate 22, a centrifugal separator 24, pumps 26, 28 and valves 30 and 33.

At least an outer layer 34 on the high pressure side of the membrane 18 is in the form of a microporous membrane of an aliphatic hydrocarbon liquid swellable, polysulfone compound, the whole of the membrane having been gelled in an aqueous gelation liquid, the microporous membrane being manufactured and maintained substantially free of any adsorbed aliphatic hydrocarbon and having a molecular weight cut off of less than about 20,000, when measured in an aqueous medium. One method of providing such an aliphatic hydrocarbon liquid swellable membrane 18 is described and claimed in U.S. Pat. No. 4,451,424, dated May 29, 1984, for casting polysulfone membranes.

In operation, a predominantly aliphatic hydrocarbon liquid in the form of a fossil derived aliphatic hydrocarbon liquid 2 containing, in this embodiment, at least one substance selected from the group consisting of nitrogen, sulphur, aluminum, chromium, copper, nickel, vanadium and asphaltenes, together with an optional solvent 8, such as naphtha, mixed therewith by stirrer 4, if it is necessary to reduce the viscosity of the hydrocarbon liquid 2 in this manner, is pumped by the pump 12 through the heat exchanger 14 to provide a pressure differential in the range one to 100 atmospheres at the membrane 18 of the membrane separating device 16. As previously stated, if necessary, the viscosity of the fossil derived aliphatic hydrocarbon liquid 2 can be reduced to less than about 600 centipoise by mixing the solvent 8 with the hydrocarbon liquid 12 using the stirrer 4. The viscosity of the fossil derived aliphatic hydrocarbon liquid 2 can also, if necessary, be reduced to less than about 600 centipoise by heating the fossil derived aliphatic hydrocarbon liquid using the heat exchanger 14 alone or in combination with the addition of solvent 8 thereto.

It is necessary for the viscosity of the fossil derived aliphatic hydrocarbon liquid to be reduced to less than about 600 centipoise in order that the fossil derived aliphatic hydrocarbon liquid can be pumped across the outer layer 34 of the membrane 18 at a high enough velocity in order that the membrane 18 will not become blinded by the fossil derived aliphatic hydrocarbon liquid.

The outer layer 34 on the high pressure side of the membrane 18 is contacted with the aliphatic hydrocarbon liquid until the outer layer 34 has swelled to have a molecular weight cut off of less than about 4,000, when measured in hydrocarbon liquid.

Continued pumping of the fossil derived, aliphatic hydrocarbon liquid, at a viscosity of less than about 600 centipoise and at a pressure differential in the range of about one atmosphere to about 100 atmospheres (i.e. 0.1 to 10.0 MPa), across and in contact with the swelled outer layer 34 on the high pressure side of the membrane 18 causes fossil derived, aliphatic hydrocarbon liquid depleted in the said at least one substance to permeate the membrane.

The hydrocarbon liquid, together with any solvent present, is forced through the membrane 18 leaving behind a retentate enriched with the substance selected from the group consisting of nitrogen, aluminum, chromium, copper, sulphur, nickel, vanadium and asphaltenes. The retentate flows across the membrane and is collected in the tank 20. If desired, retentate 22 may be pumped by pump 26 from the tank 20 to the centrifugal separator 24, where solid substances whether already present in, or precipitated from, the concentrated retentate are removed and returned to the tank 20. The retentate with filtered substances removed therefrom is pumped by the pump 28 to the tank 1 to be processed once more.

The fossil derived, aliphatic hydrocarbon liquid permeate, depleted in the said at least one substance, is removed from the membrane 18 along pipe 36.

In other embodiments of the present invention, the outer layer 34 is swelled by contact with aliphatic hydrocarbon liquid before assembly in the device 16.

The following tables give the results of tests carried out to verify the present invention using the apparatus shown in FIG. 1.

Each table gives the results of different tests carried out for the removal of substances for a particular fossil derived, aliphatic hydrocarbon liquid using similar or different membranes in each test in the table.

In the following Table 1, new and used diesel lubricating oil was passed at a pressure of 1.0±0.1 Bar at 60° C. through the membranes specified at the particular fluxes given.

TABLE I

| | | Spent diesel lubrication oil (SAE 30) | | | | | | | | |
|---|---|---|---|---|---|---|---|---|---|---|
| | | Al | Cu | Fe | Pb | Si | Zn | Ca | P | Visc. | Flux* |
| | | Inorganic Substances Present (PPM) | | | | | | | | |
| New Oil | | 2 | 1 | 1 | 1 | 2 | 564 | 1373 | 537 | 30 | |
| Used Oil | | 4–9 | 7–20 | 43 | 1 | 10 | 581 | 1629 | 651 | 30–37 | |
| Test No. | Membrane | Permeate (Inorganic Substances) | | | | | | | | |
| 1 | 70-T | 1 | 7 | 1 | 0.8 | 2 | 70 | 53 | 225 | 20 | 7.1 |
| 2 | 85-T | 1 | 3 | 1 | 1 | 4 | 72 | 55 | 185 | 24 | 3.6 |

TABLE I-continued

| | | Spent diesel lubrication oil (SAE 30) | | | | | | | | | |
|---|---|---|---|---|---|---|---|---|---|---|---|
| | | Al | Cu | Fe | Pb | Si | Zn | Ca | P | Visc. | Flux* |
| 3 | PI | 1 | 2 | 1 | 1 | 5 | 192 | | 305 | 28 | |

*Kg/m²/day

PPM is in milligrams per liter.

70-T is a flat polysulfone membrane which separates polyethylene glycol of molecular weight 6,000 to 70% as defined by $$\frac{\text{concentration in feed} - \text{concentration in permeate}}{\text{concentration in feed}}$$

and 85-T is a flat polysulfone membrane which separates polyethylene glycerol of molecular weight 6000 to 85% as defined above, indicating that the molecular weight cut off of the membranes is around 10,000 and 7,000 respectively. In both 70-T and 85-T the polysulphone membrane was cast on a support of a spun bonded polyethylene paper marketed under the trade mark TYVEK by Du Pont, Wilmington, Del., U.S.A. PI was a polyimide polymer composite marketed as polyimide 8010 by the UpJohn Co. Ltd., Kalamazoo, Mich., U.S.A.

The following Tables II to XII give the results of tests for different fossil derived, free flowing, hydrocarbon liquids using flat polysulfone membranes on polyester supports.

Where the membrane numbers are followed by U, such as 2U, this indicates that these membranes were made from polysulfone marketed under trade name UDEL 3500 by Union Carbide Corporation.

Where the membrane numbers are followed by V, such as 3V, this indicates that these membranes were made from polysulfone marketed under the trade mark VICTREX by Imperial Chemical Industries, London, England.

In the Tables the separation results given for chromium and vanadium were measured using a method that was unreliable below 2 ppm and so these results are given merely to show that separation of chromium and vanadium occurred.

In Tables II to XII the viscosity results were determined at 20° C. for all samples.

In the following Table II the feed was Venezuela crude oil, fed at a flow rate of 0.192 kg/second, and at a temperature of 30° C. The feed pressure was between 2.0 MPa and 2.5 MPa. The volume of crude oil used in each test was 9.0 liters having a mean viscosity at 30° C. of 10.0 mPa·s.

In the following Table III the feed was the Venezuelan crude oil retentate from the test of the same designation in Table II, which was the remaining concentrated 60% by volume of the feed for Table II.

In Table III the flow rate of the feed for each test was 0.065 kg/second, at a temperature of 37° C. The feed pressure was between 2.0 MPa and 2.5 MPa. The volume of oil used in each test was 5.0 liters having a means viscosity at 37° C. of 25.5 mPa·s.

TABLE II

| MEMBRANE | INITIAL FEED | MEMBRANES IN SERIES FLOW | | | | FINAL FEED |
|---|---|---|---|---|---|---|
| | | 1 U | 2 V | 3 U | 4 V | |
| PRESSURE, MPa | | 2.45 | 2.27 | 2.18 | 2.09 | |
| FLUX, kg/m² day | | 30.2 | 31.4 | 120.5 | 77.4 | |
| VISCOSITY, mPa.s | 13.54 | 3.32 | 3.49 | 3.44 | 4.13 | 15.95 |
| VARIATION, % | | 77.5 | 76.3 | 76.7 | 72.0 | |
| SULPHUR, % | 1.16 | 0.61 | 0.64 | 0.62 | 0.67 | 1.12 |
| SEPARATION, % | | 46.5 | 43.9 | 45.6 | 41.2 | |
| VANADIUM, ppm | 102.0 | 3.0 | 3.0 | 3.0 | 5.7 | 106.0 |
| SEPARATION, % | | 97.1 | 97.1 | 97.1 | 94.5 | |
| NICKEL, ppm | 11.0 | 0.7 | 0.7 | 0.7 | 0.7 | 11.0 |
| SEPARATION, % | | 93.6 | 93.60 | 93.6 | 93.6 | |
| CHROMIUM, ppm | 2.4 | 0.6 | 0.6 | 0.6 | 0.6 | 1.7 |
| SEPARATION, % | | 70.7 | 70.7 | 70.7 | 70.7 | |
| NITROGEN, g/l | 8.0 | 2.0 | | 1.9 | 2.3 | 8.0 |
| SEPARATION, % | | 74.7 | | 76.2 | 71.3 | |

TABLE III

| MEMBRANE | INITIAL FEED | MEMBRANES IN SERIES FLOW | | | | FINAL FEED |
|---|---|---|---|---|---|---|
| | | 1 U | 2 V | 3 U | 4 V | |
| PRESSURE, MPa | | 2.45 | 2.27 | 2.18 | 2.09 | |
| FLUX, kg/m² day | | 18.4 | 20.6 | 66.8 | 41.8 | |
| VISCOSITY, mPa.s | 37.00 | 4.93 | 5.36 | 5.23 | 6.27 | 55.68 |
| VARIATION, % | | 89.4 | 88.4 | 88.7 | 86.5 | |
| SULPHUR, % | 1.34 | 0.71 | 0.73 | 0.71 | 0.78 | 1.39 |
| SEPARATION, % | | 48.0 | 46.5 | 48.0 | 42.9 | |
| VANADIUM, ppm | 143.0 | 3.0 | 3.0 | 3.0 | 10.0 | 157.0 |
| SEPARATION, % | | 98.0 | 98.0 | 98.00 | 93.3 | |
| NICKEL, ppm | 15.0 | 0.7 | 0.7 | 0.7 | 1.2 | 16.0 |
| SEPARATION, % | | 95.5 | 95.5 | 95.5 | 92.3 | |
| *CHROMIUM, ppm | 2.6 | 0.6 | 0.6 | 0.6 | 0.6 | 2.6 |
| | | ALL >77% SEPARATION | | | | |
| NITROGEN, g/l | 10.41 | 2.51 | 2.54 | 3.04 | | 10.41 |

TABLE III-continued

| MEMBRANE | INITIAL FEED | MEMBRANES IN SERIES FLOW | | | | FINAL FEED |
|---|---|---|---|---|---|---|
| | | 1 U | 2 V | 3 U | 4 V | |
| SEPARATION, % | | 75.9 | | 75.6 | 70.8 | |

*Chromium separation should be above 90% but the results obtained used a measuring method which was unreliable below 2 ppm and so results are given merely to show that chromium separation occurred.

In the following Table IV the feed was Texas crude oil, fed at a flow rate of 0.270 kg/second, and at a temperature of 20° C. The feed pressure for each test was between 2.0 MPa and 2.5 MPa. The volume of crude oil used in each test was 5.0 liters having a mean viscosity at 20° C. of 5.1 mPa·s.

TABLE IV

| MEMBRANE | INITIAL FEED | MEMBRANES IN SERIES FLOW | | | | | | | | | FINAL FEED |
|---|---|---|---|---|---|---|---|---|---|---|---|
| | | 1 U | 2 V | 3 V | 4 V | 5 V | 6 U | 7 U | 8 V | 9 V | |
| PRESSURE, MPa | | 2.45 | 2.36 | 2.32 | 2.27 | 2.23 | 2.18 | 2.14 | 2.09 | 2.05 | — |
| FLOWRATE, mg/s | | 29.18 | 5.50 | 4.43 | 15.52 | 48.11 | 119.60 | 109.20 | 242.60 | 162.27 | — |
| FLUX, kg/m² day | | 158.6 | 29.9 | 24.1 | 84.3 | 261.4 | 649.9 | 593.4 | 318.3 | 881.8 | — |
| VISCOSITY, mPa.s | 4.78 | 3.81 | 3.51 | 3.24 | — | 4.04 | 4.12 | 4.02 | 4.63 | 4.64 | 5.30 |
| VARIATION, % | | 24.4 | 30.4 | 35.7 | — | 19.8 | 18.30 | 20.20 | 8.10 | 7.94 | — |
| SULPHUR, % | 0.20 | 0.18 | 0.17 | 0.16 | 0.17 | 0.18 | 0.18 | 0.18 | 0.19 | 0.19 | 0.19 |
| SEPARATION, % | | 7.7 | 12.8 | 17.9 | 12.8 | 7.7 | 7.7 | 7.7 | 2.6 | 2.6 | |
| NITROGEN, g/l | 3.42 | 2.34 | 2.31 | — | — | — | 2.36 | — | 2.66 | — | 3.42 |
| SEPARATION, % | | 31.6 | 32.3 | | | | 30.9 | | 22.0 | | |

In the following Table V the feed was crude oil from Leduc, Alberta, Canada, fed at a flow rate of 0.264 kg/second, and at a temperature of 24° C. The feed pressure was between 2.0 MPa and 2.5 MPa. The volume of crude oil used in each test was 9.0 liters having a mean viscosity at 24° C. of 56.5 mPa·s.

TABLE V

| MEMBRANE | INITIAL FEED | MEMBRANES IN SERIES FLOW | | | | | | | | | FINAL FEED |
|---|---|---|---|---|---|---|---|---|---|---|---|
| | | 1 U | 2 V | 3 V | 4 V | 5 V | 6 U | 7 U | 8 V | 9 V | |
| PRESSURE, MPa | | 2.45 | 2.36 | 2.32 | 2.27 | 2.23 | 2.18 | 2.14 | 2.09 | 2.05 | |
| FLOWRATE, mg/s | | 7.92 | 2.03 | 1.44 | 7.44 | 14.35 | 32.23 | 30.37 | 16.29 | 11.01 | |
| FLUX, kg/m² day | | 43.0 | 11.0 | 7.8 | 40.4 | 78.0 | 175.1 | 165.0 | 88.5 | 59.8 | |
| VISCOSITY, mPa.s | 60.25 | 2.46 | 2.75 | 2.87 | 3.25 | 2.53 | 2.54 | 2.56 | 2.77 | 2.68 | 66.01 |
| VARIATION, % | | 96.1 | 95.6 | 95.5 | 94.6 | 96.0 | 95.9 | 95.6 | 95.6 | 95.0 | |
| SULPHUR, % | 0.22 | 0.15 | 0.16 | 0.18 | 0.15 | 0.15 | 0.14 | 0.15 | 0.16 | 0.15 | 0.23 |
| SEPARATION, % | | 33.3 | 28.9 | 20.0 | 33.3 | 33.3 | 37.8 | 33.3 | 28.9 | 33.3 | |
| VANADIUM, ppm | 1.2 | 0.6 | 1.0 | 1.1 | 0.6 | 0.6 | 0.6 | 0.6 | 0.6 | 0.6 | 1.2 |
| | | 50.0 | 16.7 | 8.3 | 50.0 | 50.0 | 50.0 | 50.0 | 50.0 | 50.0 | |
| NICKEL, ppm | 1.3 | 0.5 | 0.5 | 0.5 | 0.5 | 0.5 | 0.5 | 0.5 | 0.5 | 0.5 | 1.4 |
| SEPARATION, % | | 63.0 | 63.0 | 63.0 | 63.0 | 63.0 | 63.0 | 63.0 | 63.0 | 63.0 | |
| NITROGEN, g/l | 4.27 | 1.53 | 1.83 | | | | 1.51 | | 1.61 | | 4.27 |
| SEPARATION, % | | 64.1 | 57.1 | | | | 64.7 | | 62.4 | | |

In the following Table VI the feed was from the Leduc crude oil retentate from the test of the same designation in Table V, which was the remaining concentrated 50% by volume of the feed from Table V.

In Table VI, the flow rate of the feed for each test was 0.129 kg/second, at a temperature of 24° C. The feed pressure was between 2.0 MPa and 2.5 MPa. The volume of oil used in each test was 4.5 liters having a mean viscosity at 24° C. of 16.5 mPa·s.

TABLE VI

| MEMBRANE | INITIAL FEED | MEMBRANES IN SERIES FLOW | | | | | | | | | FINAL FEED |
|---|---|---|---|---|---|---|---|---|---|---|---|
| | | 1 U | 2 V | 3 V | 4 V | 5 V | 6 U | 7 U | 8 V | 9 V | |
| PRESSURE, MPa | | 2.45 | 2.36 | 2.32 | 2.27 | 2.23 | 2.18 | 2.14 | 2.09 | 2.05 | |
| FLUX, kg/m² day | | 21.3 | 6.2 | 4.8 | 22.3 | 39.5 | 83.2 | 75.0 | 41.7 | 27.8 | |
| VISCOSITY, mPa.s | 19.67 | 3.15 | 4.07 | 4.43 | 3.21 | 3.43 | 3.31 | 3.38 | 3.62 | 3.67 | 16.25 |
| VARIATION, % | | 82.5 | 77.3 | 75.3 | 82.1 | 80.9 | 81.6 | 81.2 | 79.8 | 79.6 | |
| SULPHUR, % | 0.29 | 0.18 | 0.19 | 0.20 | 0.18 | 0.18 | 0.18 | 0.18 | 0.19 | 0.19 | 0.30 |
| SEPARATION, % | | 39.0 | 35.6 | 32.2 | 39.0 | 39.0 | 39.0 | 39.0 | 35.6 | 35.6 | |
| VANADIUM, ppm | 2.3 | 2.0 | 2.0 | 2.0 | 2.0 | 2.0 | 2.0 | 2.0 | 2.0 | 2.0 | 2.0 |
| | | 7.0 | 7.0 | 7.0 | 7.0 | 7.0 | 7.0 | 7.0 | 7.0 | 7.0 | |
| NICKEL, ppm | 2.4 | 0.5 | 0.5 | 0.5 | 0.5 | 0.5 | 0.5 | 0.5 | 0.5 | 0.5 | 2.6 |
| SEPARATION, % | | 80.0 | 80.0 | 80.0 | 80.0 | 80.0 | 80.0 | 80.0 | 80.0 | 80.0 | |
| NITROGEN, g/l | 6.58 | 2.01 | 2.59 | | | | 2.26 | | 2.64 | | 6.58 |
| SEPARATION, % | | 69.5 | 60.7 | | | | 65.6 | | 59.9 | | |

In the following Table VII the feed was that known as Mydale crude oil from Venezuela, fed at a flow rate of 0.110 kg/second, and at a temperature of 50° C. The feed pressure was between 2.0 MPa and 2.5 MPa. The voluae of crude oil used in each test was 9.0 liters having a mean viscosity at 50° C. of 19.5 mPa·s.

TABLE VII

| MEMBRANE | INITIAL FEED | MEMBRANES IN SERIES FLOW | | | | | | | | | FINAL FEED |
|---|---|---|---|---|---|---|---|---|---|---|---|
| | | 1 U | 2 V | 3 V | 4 V | 5 V | 6 U | 7 U | 8 V | 9 V | |
| PRESSURE, MPa | | 2.45 | 2.36 | 2.32 | 2.27 | 2.23 | 2.18 | 2.14 | 2.09 | 2.05 | |
| FLUX, kg/m² day | | 56.2 | 15.1 | 11.9 | 56.2 | 83.0 | 151.6 | 127.1 | 90.0 | 67.2 | |
| VISCOSITY, mPa.s | 50.00 | 4.51 | 5.19 | 6.30 | 5.08 | 5.18 | 5.34 | 5.85 | 5.73 | 6.60 | 53.00 |
| VARIATION, % | | 91.2 | 89.9 | 87.8 | 90.1 | 89.9 | 89.6 | 88.6 | 88.9 | 87.2 | |
| SULPHUR, % | 2.29 | 1.19 | 1.17 | 1.10 | 1.20 | 1.19 | 1.17 | 1.24 | 1.26 | 1.32 | 2.22 |
| SEPARATION, % | | 47.2 | 48.1 | 51.2 | 46.8 | 47.2 | 48.1 | 45.0 | 44.1 | 41.5 | |
| VANADIUM, ppm | 45.0 | 2.0 | 2.0 | 2.0 | 2.0 | 2.0 | 2.0 | 2.0 | 2.3 | 4.71 | 47.0 |
| SEPARATION, % | | 95.7 | 95.7 | 95.7 | 95.7 | 95.7 | 95.7 | 95.7 | 95.0 | 89.8 | |
| NICKEL, ppm | 17.0 | 0.4 | 0.4 | 0.5 | 0.6 | 0.5 | 0.4 | 0.6 | 1.1 | 2.0 | 18.0 |
| SEPARATION, % | | 97.7 | 97.7 | 97.1 | 96.6 | 97.1 | 97.7 | 96.6 | 93.7 | 88.6 | |
| NITROGEN, g/l | 10.83 | 2.76 | 2.64 | | | | 2.66 | | 2.84 | | 10.83 |
| SEPARATION, % | | 74.5 | 75.6 | | | | 75.4 | | 73.8 | | |

Referring now to FIG. 2, there is shown a graph of the molecular weight distribution of the test designated 6U in Table VII, obtained by a high performance liquid chromatograph.

In FIG. 2 molecular weight M is plotted against elution volume V, ----- is for the feed which had a weight averaged molecular weight of 576 and a substantial portion of high molecular weight material, and—is for the permeate which had a weight averaged molecular weight of 320 and negligible high molecular weight material.

In the following Table VIII, the feed was the Mydale crude oil retentate from the test of the same designation in Table VII, which was the remaining concentrated 40% by volume of the feed for Table VII.

In Table VIII the flow rate of the feed for each test was 0.042 kg/second, at a temperature of 60° C. The feed pressure was between 2.0 MPa and 3.5 MPa. The volume of oil used in each test was 4.0 liters having a mean viscosity at 60° C. of 98.7 mPa·s.

TABLE VIII

| MEMBRANE | INITIAL FEED | MEMBRANES IN SERIES FLOW | | | | | | | | | FINAL FEED |
|---|---|---|---|---|---|---|---|---|---|---|---|
| | | 1 U | 2 V | 3 V | 4 V | 5 V | 6 U | 7 U | 8 V | 9 V | |
| PRESSURE, MPa | | 3.36 | 3.09 | 2.95 | 2.82 | 2.68 | 2.55 | 2.41 | 2.27 | 2.14 | |
| FLUX, kg/m² day | | 40.6 | 9.9 | 7.9 | 32.0 | 39.7 | 73.5 | 55.8 | 42.1 | 35.1 | |
| VISCOSITY, mPa.s | 673.00 | 7.61 | 9.94 | 9.78 | 9.87 | 10.26 | 10.74 | 11.91 | 13.49 | 17.61 | 262.00 |
| VARIATION, % | | 99.2 | 99.0 | 99.0 | 99.0 | 98.9 | 98.9 | 98.8 | 98.6 | 98.2 | |
| SULPHUR, % | 2.86 | 1.35 | 1.44 | 1.40 | 1.42 | 1.45 | 1.41 | 1.47 | 1.55 | 1.68 | 2.47 |
| SEPARATION, % | | 49.3 | 46.0 | 47.5 | 46.7 | 45.6 | 47.1 | 44.8 | 41.8 | 37.0 | |
| VANADIUM, ppm | 68.0 | 2.1 | 2.3 | 2.9 | 2.0 | 2.6 | 2.4 | 3.3 | 5.6 | 15.0 | 72.0 |
| SEPARATION, % | | 97.0 | 96.7 | 95.9 | 97.1 | 96.3 | 96.6 | 95.3 | 92.0 | 78.6 | |
| NICKEL, ppm | 25.0 | 0.8 | 1.0 | 1.0 | 0.9 | 0.9 | 0.9 | 1.4 | 2.2 | 6.1 | 27.0 |
| SEPARATION, % | | 96.9 | 96.2 | 96.2 | 96.5 | 96.5 | 96.5 | 94.6 | 91.5 | 76.5 | |
| NITROGEN, g/l | 15.12 | 2.81 | 3.29 | | | | 3.09 | | 4.04 | | 15.12 |
| SEPARATION, % | | 81.4 | 78.2 | | | | 79.6 | | 73.3 | | |

In the following Table IX the feed was that known as Boundary Lake crude oil from British Columbia, Canada, fed at a flow rate of 0.139 kg/second, and at a temperature of 25° C. The feed pressure was between 1.5 MPa and 2.0 MPa. The volume of crude oil used in each test was 7.0 liters having a mean viscosity at 25° C. of 8.5 mPa·s.

TABLE IX

| MEMBRANE | INITIAL FEED | MEMBRANES IN SERIES FLOW | | | | | | | | | FINAL FEED |
|---|---|---|---|---|---|---|---|---|---|---|---|
| | | 1 U | 2 V | 3 V | 4 V | 5 V | 6 U | 7 U | 8 V | 9 V | |
| PRESSURE, MPa | | 2.45 | 2.36 | 2.32 | 2.27 | 2.23 | 2.18 | 2.14 | 2.09 | 2.05 | |
| FLUX, kg/m² day | | 23.7 | 6.8 | 5.0 | 25.3 | 45.1 | 87.8 | 80.4 | 65.2 | 46.5 | |
| VISCOSITY, mPa.s | 10.06 | 3.04 | 3.38 | 3.41 | 3.02 | 3.38 | 3.05 | 3.22 | 3.65 | 5.08 | 11.28 |
| VARIATION, % | | 71.5 | 68.3 | 68.0 | 71.7 | 68.3 | 71.4 | 69.8 | 65.8 | 52.4 | |
| SULPHUR, % | 0.80 | 0.47 | 0.52 | 0.53 | 0.47 | 0.49 | 0.48 | 0.50 | 0.50 | 0.62 | 0.83 |
| SEPARATION, % | | 42.3 | 36.2 | 35.0 | 42.3 | 39.9 | 41.1 | 38.7 | 38.7 | 23.9 | |
| VANADIUM, ppm | 38.0 | 1.1 | 2.0 | 3.9 | 0.9 | 1.6 | 1.0 | 0.8 | 3.3 | 13.0 | 40.0 |
| SEPARATION, % | | 97.2 | 94.9 | 90.0 | 97.7 | 95.9 | 97.4 | 97.9 | 91.5 | 66.0 | |
| NICKEL, ppm | 12.0 | 0.5 | 0.5 | 1.0 | 0.5 | 0.5 | 0.5 | 0.5 | 0.9 | 3.7 | 12.0 |
| SEPARATION, % | | 95.8 | 95.8 | 91.7 | 95.8 | 95.8 | 95.8 | 95.8 | 92.5 | 69.2 | |
| NITROGEN, g/l | 9.60 | 3.32 | 3.59 | | | | 3.01 | | 3.62 | | 9.60 |
| SEPARATION, % | | 65.5 | 62.6 | | | | 68.6 | | 62.3 | | |
| Wt. average Molecular Wt. | 553 | 318 | 338 | 367 | 327 | 346 | 327 | 340 | 377 | 433 | 592 |

In the following Table X the feed was the Boundary Lake retentate from the test of the same designation in Table IX, which was the remaining concentrated 57% by volume of the feed for Table IX.

In Table X the flow rate of the feed for each test was 0.103 kg/second, at a temperature of 35° C. The feed pressure was between 2.0 MPa and 2.5 MPa. The volume of the oil used in each test was 4.0 liters having a mean viscosity at 35° C. of 17.5 mPa·s.

TABLE X

| MEMBRANE | INITIAL FEED | MEMBRANES IN SERIES FLOW | | | | | | | | FINAL FEED |
| --- | --- | --- | --- | --- | --- | --- | --- | --- | --- | --- |
| | | 1 U | 2 V | 3 V | 4 V | 5 V | 6 U | 7 U | 8 V | |
| PRESSURE, MPa | | 2.45 | 2.36 | 2.27 | 2.23 | 2.18 | 2.14 | 2.09 | 2.05 | |
| FLUX, kg/m² day | | 18.3 | 5.0 | 19.5 | 33.6 | 62.7 | 59.6 | 44.9 | 32.1 | |
| VISCOSITY, mPa.s | 24.34 | 4.86 | 5.20 | 5.17 | 5.06 | 4.96 | 5.39 | 6.65 | 8.68 | 29.84 |
| VARIATION, % | | 82.1 | 80.8 | 80.9 | 81.3 | 81.7 | 80.1 | 75.5 | 68.0 | |
| SULPHUR, % | 0.92 | 0.54 | 0.54 | 0.58 | 0.52 | 0.51 | 0.56 | 0.61 | 0.70 | 0.95 |
| SEPARATION, % | | 42.2 | 42.2 | 38.0 | 44.4 | 45.5 | 40.1 | 34.8 | 25.1 | |
| VANADIUM, ppm | 54.0 | 1.3 | 1.7 | 1.1 | 2.1 | 1.6 | 1.7 | 10.0 | 24.0 | 55.0 |
| SEPARATION, % | | 97.6 | 96.9 | 98.0 | 96.1 | 97.1 | 96.9 | 81.7 | 56.0 | |
| NICKEL, ppm | 17.0 | 0.5 | 0.5 | 0.5 | 0.5 | 0.5 | 0.7 | 3.3 | 7.5 | 18.0 |
| SEPARATION, % | | 97.1 | 97.1 | 97.1 | 97.1 | 97.1 | 96.0 | 81.1 | 57.1 | |
| NITROGEN, g/l | 12.56 | 3.82 | 3.97 | | | 3.62 | | 5.35 | | 12.56 |
| SEPARATION, % | | 69.6 | 68.4 | | | 71.2 | | 57.4 | | |
| Wt. average Molecular Wt. | 661 | 356 | 387 | 377 | 364 | 357 | 364 | 440 | 496 | 688 |

In the following Table XI the feed was a Canadian pipeline blend of crude oils, of unknown origin, fed at a flow rate of 0.210 kg/second, and at a temperature of 30° C. The feed pressure for each test was between 2.0 MPa and 2.5 MPa. The volume of the crude oil used in each test was 9.5 liters having a mean viscosity at 30° C. of 8.6 mPa·s.

For comparison, the analysis of the maltene fraction, recovered by the conventional method of solvent extration and centrifugation is shown.

The following Tables XIII to XXI give results of tests carried out on various tar sands bitumen to verify the present invention for different membranes.

In Tables XIII to XXI, the viscosity of feed samples was determined at the specified operating temperatures while the viscosity of the permeate samples was determined at 20° C.

In the following Table XIII, the feed was Athabasca Tar Sands bitumen obtained from the Solvent Extraction Spherical Agglomeration (SESA) process. The flow on the retentate side of the membranes was 3 liters/minute at a pressure of 9 bars and at 20° C.

TABLE XI

| MEMBRANE | INITIAL FEED | MEMBRANES IN SERIES FLOW | | | | | | | | | FINAL FEED |
| --- | --- | --- | --- | --- | --- | --- | --- | --- | --- | --- | --- |
| | | 1 U | 2 V | 3 V | 4 V | 5 V | 6 U | 7 U | 8 V | 9 V | |
| PRESSURE, MPa | | 2.45 | 2.36 | 2.32 | 2.27 | 2.23 | 2.18 | 2.14 | 2.09 | 2.05 | |
| FLUX, kg/m² day | | 31.3 | 8.7 | 7.2 | 34.8 | 61.3 | 133.7 | 123.9 | 70.9 | 46.3 | |
| VISCOSITY, mPa.s | 10.29 | 3.47 | 3.85 | 4.09 | 3.74 | 3.77 | 3.72 | 3.82 | 3.87 | 3.85 | 12.27 |
| VARIATION, % | | 69.2 | 65.9 | 63.7 | 66.8 | 66.6 | 67.0 | 66.1 | 65.7 | 65.9 | |
| MW | 414. | 244. | 259. | 266. | 254. | 254. | 251. | 254. | 259. | 256. | 426. |
| VARIATION, % | | 41.9 | 38.3 | 36.7 | 39.5 | 39.5 | 40.2 | 39.5 | 38.3 | 39.0 | |
| SULPHUR, % | 0.58 | 0.36 | 0.36 | 0.38 | 0.35 | 0.36 | 0.35 | 0.36 | 0.35 | 0.36 | 0.62 |
| SEPARATION, % | | 40.0 | 40.0 | 36.7 | 41.7 | 40.0 | 41.7 | 40.0 | 41.7 | 40.0 | |
| VANADIUM, ppm | 2.5 | 2.0 | 2.0 | 2.0 | 2.0 | 2.0 | 2.0 | 2.0 | 2.0 | 2.0 | 3.2 |
| SEPARATION, % | | 29.8 | 29.8 | 29.8 | 29.8 | 29.8 | 29.8 | 29.8 | 29.8 | 29.8 | |
| NICKEL, ppm | 3.4 | 0.5 | 0.5 | 0.5 | 0.5 | 0.5 | 0.5 | 0.5 | 0.5 | 0.5 | 3.7 |
| SEPARATION, % | | 85.9 | 85.9 | 85.9 | 85.9 | 85.9 | 85.9 | 85.9 | 85.9 | 85.9 | |
| NITROGEN, g/l | 6.38 | 1.76 | 2.04 | | | | 1.84 | | 1.99 | | 6.38 |
| SEPARATION, % | | 72.4 | 68.1 | | | | 71.2 | | 68.9 | | |

In the following Table XII the feed was the pipeline blend of crude oils retentate from the test of the same designation in Table XI, representing the remaining concentrated 47% of the initial feed of Table XI.

In Table XII the flow rate of the feed for each test was 0.132 kg/second, at a temperature of 30° C. The feed pressure was between 2.0 MPa and 2.5 MPa. The volume of the oil used in each test was 5.0 liters having a mean viscosity at 30° C. of 15.4 mPa·s.

TABLE XII

| MEMBRANE | INITIAL FEED | MEMBRANES IN SERIES FLOW | | | | FINAL FEED |
| --- | --- | --- | --- | --- | --- | --- |
| | | U | 2 V | 3 U | 4 V | |
| PRESSURE, MPa | | 2.45 | 2.27 | 2.18 | 2.09 | |
| FLUX, kg/m² day | | 15.9 | 19.7 | 65.8 | 41.8 | |
| VISCOSITY | 22.88 | 4.46 | 5.06 | 5.60 | 5.92 | 22.88 |
| VARIATION, % | | 80.5 | 77.9 | 75.5 | 74.1 | |
| MW | 465. | 259. | 269. | 270. | 285. | 481. |
| VARIATION, % | | 45.2 | 43.1 | 42.9 | 39.7 | |
| SULPHUR, % | 0.63 | 0.35 | 0.35 | 0.36 | 0.37 | 0.65 |
| SEPARATION, % | | 45.3 | 45.3 | 43.7 | 42.2 | |
| VANADIUM, ppm | 3.8 | 0.6 | 0.6 | 0.6 | 0.6 | 4.5 |
| SEPARATION, % | | 85.5 | 85.5 | 85.5 | 85.5 | |
| NICKEL, ppm | 6.0 | 0.5 | 0.5 | 0.5 | 0.5 | 6.8 |
| SEPARATION, % | | 92.2 | 92.2 | 92.2 | 92.2 | |
| NITROGEN, g/l | 8.14 | 2.01 | | 2.11 | 2.61 | 8.14 |
| SEPARATION, % | | 75.3 | | 74.1 | 67.9 | |

For comparison, the analysis of oil upgraded by the conventional method of solvent extraction and centrifugation called Maltenes is shown. It is evident that the conventional method for removing asphaltenes is not effective in removing nitrogen, sulphur, nickel and vanadium which are the most important contaminants, and so, contrary to conventional thinking, these inorganic substances are not necessarily associated with the high molecular weight asphaltenes and removed therewith as in some instances are, for example, chromium, iron and copper.

This suggested that the pore size distribution of the polysulfone membranes used in these tests were being altered in some fashion by the hydrocarbon liquid being filtered.

TABLE XIII

| Sample | Asphaltenes % of Bitumen | Weight Avg. MW | Nitrogen % | Ni ppm | V ppm | Cr ppm | Fe ppm | Cu ppm | S % | Flux* |
|---|---|---|---|---|---|---|---|---|---|---|
| MEMBRANE PROCESS | | | | | | | | | | |
| Initial feed-similar to Bitumen A | 15 | 14308 | 0.16 | 60 | 170 | 12 | 100 | 2.3 | 3.6 | ** |
| Concentrate | 20 | 41600 | 0.23 | 82 | 250 | 14 | 190 | 3.0 | 4.0 | ** |
| Membranes | | | | | | | | | | |
| 2 V | 0 | 489 | 0 | 12 | 17 | 9 | 40 | 0.3 | 2.3 | 44 |
| 1 U | 0 | 493 | 0 | 12 | 18 | 7 | 30 | 0.2 | 2.5 | 60 |
| 3 U | 0 | 623 | 0 | 16 | 33 | 9 | 40 | 0.3 | 3.0 | 100 |
| 3 U | 0 | 508 | 0 | 13 | 24 | 9 | 40 | 0.3 | 2.5 | 30 |
| 1 U | 0 | 567 | 0 | 13 | 22 | 8 | 35 | 0.3 | 2.4 | 70 |
| PAN | 0 | 635 | 0 | 13 | 26 | 6 | 30 | 0.2 | 3.0 | 24 |
| CONVENTIONAL SOLVENT EXTRACTION PROCESS USING PENTANES AND CENTRIFUGATION | | | | | | | | | | |
| Bitumen A | 15 | 14000 | 0.2 | 31 | 69 | 34 | 260 | 76 | 3.7 | |
| Maltenes A by solvent extraction | 0 | 1115 | 0.21 | 39 | 78 | 4.8 | 20 | 0.4 | 3.5 | |

PAN is a polyacrylonitrile membrane
SESA Feed
20% Oil .8% H$_2$O 2% Solids 77% Naphtha
*Flux in kg/m$^2$/day
**3 l/min feed flow In the following Table XIV, the feed was Lloyd Primary Bitumen fed at a flow rate of 0.31 kg/s, at a temperature of 38° C., and a pressure between 2.0 MPa and 2.6 MPa on the retentate side of the membranes. The volume of oil used was 8.5 liters having a mean viscosity of 85 mPa·s at 38° C.

TABLE XIV

| MEMBRANE | INITIAL FEED | 1 U | 2 V | 3 V | 4 V | 5 V | 6 U | 7 U | 8 V | 9 V | FINAL FEED |
|---|---|---|---|---|---|---|---|---|---|---|---|
| MEMBRANES IN SERIES FLOW | | | | | | | | | | | |
| PRESSURE, MPa | | 2.55 | 2.44 | 2.38 | 2.33 | 2.27 | 2.22 | 2.16 | 2.11 | 2.05 | |
| FLUX, kg/m$^2$ day | | 12.8 | 2.7 | 5.4 | 10.0 | 18.5 | 35.2 | 28.5 | 19.2 | 13.5 | |
| VISCOSITY, mPa.s | 68.60 | 4.20 | | 5.96 | 4.89 | 4.97 | 4.92 | 5.10 | 6.26 | 6.51 | 102.00 |
| VARIATION, % | | 95.1 | | 93.0 | 94.3 | 94.2 | 94.2 | 94.0 | 92.7 | 92.4 | |
| MW | 843. | 390. | | 444. | 420. | 432. | 423. | 440. | 474. | 482. | 843. |
| VARIATION, % | | 53.7 | | 47.3 | 50.2 | 48.8 | 49.8 | 47.8 | 43.8 | 42.8 | |
| SULPHUR, % | 3.39 | 1.71 | 2.01 | 1.88 | 1.85 | 2.05 | 1.79 | 1.86 | 1.97 | 1.99 | 3.32 |
| SEPARATION, % | | 49.0 | 40.1 | 44.0 | 44.9 | 38.9 | 46.6 | 44.6 | 41.3 | 40.7 | |
| VANADIUM, ppm | 62.0 | 1.1 | 3.6 | 3.1 | 1.8 | 2.0 | 1.7 | 1.8 | 4.8 | 9.9 | 64.0 |
| SEPARATION, % | | 98.3 | 94.3 | 95.1 | 97.1 | 96.8 | 97.3 | 97.1 | 92.4 | 84.3 | |
| NICKEL, ppm | 29.0 | 1.0 | 2.0 | 1.7 | 1.0 | 1.6 | 0.9 | 1.3 | 2.7 | 4.6 | 29.0 |
| SEPARATION, % | | 96.6 | 93.1 | 94.1 | 96.6 | 94.5 | 96.9 | 95.5 | 90.7 | 84.1 | |
| NITROGEN, g/l | 13.08 | 2.41 | 3.44 | | | | 2.51 | | 3.24 | | 13.08 |
| SEPARATION, % | | 81.6 | 73.7 | | | | 80.8 | | 75.2 | | |

In the following Table XV, the feed was Lloyd Primary Bitumen from Table XIV after removal of 4.5 liters of permeate, fed at a flow rate of 0.028 kg/s at a temperature of 42° C., and a pressure between 2.0 MPa and 3.4 MPa on the retentate side of the membranes. The volume of oil used was 4.0 liters having a mean viscosity of 295 mPa·s at 42° C.

TABLE XV

| MEMBRANE | INITIAL FEED | 1 U | 2 V | 3 V | 4 V | 5 V | 6 U | 7 U | 8 V | 9 V | FINAL FEED |
|---|---|---|---|---|---|---|---|---|---|---|---|
| MEMBRANES IN SERIES FLOW | | | | | | | | | | | |
| PRESSURE, MPa | | 3.27 | 3.02 | 2.89 | 2.76 | 2.64 | 2.51 | 2.38 | 2.25 | 2.13 | |
| FLUX, kg/m$^2$ day | | 10.3 | 9.7 | 48.2 | 10.8 | 15.7 | 20.3 | 15.5 | 14.8 | 12.7 | |
| VISCOSITY, mPa.s | 276.00 | 5.66 | 6.23 | 7.38 | 8.04 | 8.95 | 7.91 | 9.25 | 9.71 | 11.77 | 314.00 |
| VARIATION, % | | 98.1 | 97.9 | 97.5 | 97.3 | 97.0 | 97.3 | 96.9 | 96.7 | 96.0 | |
| MW | 923. | 396. | 405. | 423. | 449. | 468. | 461. | 481. | 501. | 512. | 914. |
| VARIATION, % | | 56.9 | 55.9 | 53.9 | 51.1 | 49.0 | 49.8 | 47.6 | 45.5 | 44.3 | |
| SULPHUR, % | 3.75 | 1.79 | 1.82 | 1.89 | 1.85 | 1.92 | 1.92 | 1.97 | 2.05 | 2.20 | 3.90 |
| SEPARATION, % | | 53.2 | 52.4 | 50.6 | 51.6 | 49.8 | 49.8 | 48.5 | 46.4 | 42.5 | |
| VANADIUM, ppm | 103.0 | 2.6 | 1.5 | 2.7 | 2.9 | 2.3 | 2.2 | 3.4 | 4.5 | 7.0 | 107.0 |

TABLE XV-continued

| MEMBRANE | INITIAL FEED | MEMBRANES IN SERIES FLOW ||||||||| FINAL FEED |
| | | 1 U | 2 V | 3 V | 4 V | 5 V | 6 U | 7 U | 8 V | 9 V | |
|---|---|---|---|---|---|---|---|---|---|---|---|
| SEPARATION, % | | 97.5 | 98.6 | 97.4 | 97.2 | 97.8 | 97.9 | 96.8 | 95.7 | 93.3 | |
| NICKEL, ppm | 46.0 | 1.1 | 1.2 | 1.4 | 1.6 | 1.9 | 1.8 | 2.0 | 2.6 | 3.7 | 50.0 |
| SEPARATION, % | | 97.7 | 97.5 | 97.1 | 96.7 | 96.0 | 96.3 | 95.8 | 94.6 | 92.3 | |
| NITROGEN, g/l | 10.96 | 2.64 | 2.51 | | | | 3.04 | | 3.64 | | 10.96 |
| SEPARATION, % | | 75.9 | 77.1 | | | | 72.3 | | 66.8 | | |

In the following Table XVI, the feed was Cold Lake Bitumen diluted by 34% with naphtha, fed at a flow rate of 0.126 kg/s, at a temperature of 46° C., and a pressure between 2.0 MPa to 2.5 MPa on the retentate side of the membranes. The voluae of oil used was 5.5 liters having a mean viscosity of 27.2 mPa·s at 46° C.

In FIG. 3 there is shown a graph of the molecular weight distribution of the Cold Lake Bitumen test designated U6 in Table XVI obtained by the previously mentioned high performance liquid chromatograph. In FIG. 3 the molecular weight M is plotted against elution volume. The line ----- is for the feed hydrocarbon which has a weight average molecular weight, of 814 and a substantial portion of high molecular weight material (presumably asphaltenes), and line—is for the permeate which has a weight average molecular weight of about 400 and negligible high molecular weight material.

TABLE XVI

| MEMBRANE | INITIAL FEED | MEMBRANES IN SERIES FLOW ||||||||| FINAL FEED |
| | | 1 U | 2 V | 3 V | 4 V | 5 V | 6 U | 7 U | 8 V | 9 V | |
|---|---|---|---|---|---|---|---|---|---|---|---|
| PRESSURE, MPa | | 2.45 | 2.36 | 2.32 | 2.27 | 2.23 | 2.18 | 2.14 | 2.09 | 2.05 | |
| FLUX, kg/m² day | | 41.6 | 9.9 | 18.7 | 27.1 | 54.8 | 128.2 | 113.2 | 60.9 | 40.2 | |
| VISCOSITY, mPa.s | 22.00 | | 1.33 | 1.45 | 1.63 | 1.56 | 1.56 | 1.76 | 1.72 | 1.76 | 32.40 |
| VARIATION, % | | | 95.1 | 94.7 | 94.0 | 94.3 | 94.3 | 93.5 | 93.7 | 93.5 | |
| MW | 814. | 373. | 393. | 394. | 402. | 408. | 399. | 415. | 442. | 452. | 838. |
| VARIATION, % | | 54.8 | 52.4 | 52.3 | 51.3 | 50.6 | 51.7 | 59.8 | 46.5 | 45.3 | |
| SULPHUR, % | 3.30 | 1.49 | 1.34 | 1.41 | 1.47 | 1.46 | 1.46 | 1.46 | 1.52 | 1.58 | 3.32 |
| SEPARATION, % | | 55.0 | 59.5 | 57.4 | 55.6 | 55.9 | 55.9 | 54.1 | 54.1 | 52.3 | |
| VANADIUM, ppm | 102.0 | 2.1 | 2.6 | 2.8 | 2.6 | 2.9 | 1.8 | 2.2 | 4.0 | 8.6 | 108.0 |
| SEPARATION, % | | 98.0 | 97.5 | 97.3 | 97.5 | 97.2 | 98.3 | 97.9 | 96.2 | 91.8 | |
| NICKEL, ppm | 34.0 | 1.2 | 1.2 | 1.6 | 1.4 | 1.5 | 1.1 | 1.4 | 2.2 | 3.2 | 35.0 |
| SEPARATION, % | | 96.5 | 96.5 | 95.4 | 95.9 | 95.7 | 96.8 | 95.9 | 93.6 | 90.7 | |
| NITROGEN, g/l | 13.87 | 1.81 | 2.14 | | | | 2.01 | | 2.34 | | 13.87 |
| SEPARATION, % | | 87.0 | 84.6 | | | | 85.5 | | 83.2 | | |

In the following Table XVI,, the feed was Cold Lake Bitumen from the test in Table XVI after removal of 2.5 liters of permeate. The feed was introduced at a flow rate of 0.085 kg/s, at a temperature of 45° C., and a pressure between 2.0 MPa to 3.0 MPa on the retentate side of the membranes. The volume of oil used was 3.0 liters having a mean viscosity of 89.6 mPa·s at 45° C.

TABLE XVII

| MEMBRANE | INITIAL FEED | MEMBRANES IN SERIES FLOW ||||||||| FINAL FEED |
| | | 1 U | 2 V | 3 V | 4 V | 5 V | 6 U | 7 U | 8 V | 9 V | |
|---|---|---|---|---|---|---|---|---|---|---|---|
| PRESSURE, MPa | | 2.91 | 2.73 | 2.64 | 2.55 | 2.45 | 2.36 | 2.27 | 2.18 | 2.09 | |
| FLUX, kg/m² day | | 31.6 | 14.9 | 20.5 | 21.6 | 46.6 | 77.1 | 63.0 | 42.3 | 33.6 | |
| VISCOSITY, mPa.s | 74.90 | 1.72 | 2.12 | 1.96 | 2.05 | 2.06 | 2.11 | 2.25 | 2.65 | 3.55 | 104.30 |
| VARIATION, % | | 98.1 | 97.6 | 97.8 | 97.7 | 97.7 | 97.6 | 97.5 | 97.0 | 96.0 | |
| MW | 868. | 412. | 401. | 425. | 418. | 425. | 436. | 438. | 500. | 561. | 891. |
| VARIATION, % | | 53.2 | 54.4 | 51.7 | 52.5 | 51.7 | 50.4 | 50.2 | 43.1 | 36.2 | |
| SULPHUR, % | 3.64 | 1.50 | 1.63 | 1.59 | 1.64 | 1.65 | 1.65 | 1.72 | 1.84 | 2.12 | 3.63 |
| SEPARATION, % | | 58.7 | 55.2 | 56.3 | 54.9 | 54.6 | 54.6 | 52.7 | 49.4 | 41.7 | |
| VANADIUM, ppm | 124.0 | 2.8 | 4.1 | 3.1 | 3.3 | 3.5 | 3.2 | 3.8 | 11. | 30.0 | 125.0 |
| SEPARATION, % | | 97.8 | 96.7 | 97.5 | 97.3 | 96.2 | 97.4 | 96.9 | 91.2 | 75.9 | |
| NICKEL, ppm | 41.0 | 1.2 | 1.9 | 1.8 | 2.2 | 2.1 | 1.8 | 2.2 | 4.3 | 11.0 | 41.0 |
| SEPARATION, % | | 97.1 | 95.4 | 95.6 | 94.6 | 94.9 | 95.6 | 94.6 | 89.5 | 73.2 | |
| NITROGEN, g/l | 16.78 | 2.44 | 2.74 | | | | 2.81 | | 3.52 | | 16.78 |
| SEPARATION, % | | 85.5 | 83.7 | | | | 83.2 | | 79.0 | | |

In the following Table XVIII the feed was Carbonate Trend Bitumen diluted by 41% with naphtha and fed at a flow rate of 0.034 kg/s, at a temperature of 25° C., and a pressure between 2.4 MPa to 2.9 MPa on te retentate side of the membranes. The volume of oil used was 8.0 liters having a mean viscosity of 80.8 mPa·s at 25° C.

TABLE XVIII

| MEMBRANE | INITIAL FEED | MEMBRANES IN SERIES FLOW ||||||||| FINAL FEED |
| | | 1 U | 2 V | 3 V | 4 V | 5 V | 6 U | 7 U | 8 V | 9 V | |
|---|---|---|---|---|---|---|---|---|---|---|---|
| PRESSURE, MPa | | 2.85 | 2.76 | 2.72 | 2.67 | 2.63 | 2.58 | 2.54 | 2.49 | 2.45 | |
| FLUX, kg/m² day | | 32.7 | 13.5 | 25.2 | 32.6 | 50.3 | 48.1 | 64.7 | 46.0 | 44.1 | |
| VISCOSITY, mPa.s | 57.10 | 0.87 | 0.93 | 0.88 | 0.97 | 1.00 | 1.00 | 1.05 | 1.03 | 1.01 | 104.50 |

TABLE XVIII-continued

| | | MEMBRANES IN SERIES FLOW | | | | | | | | | |
|---|---|---|---|---|---|---|---|---|---|---|---|
| MEMBRANE | INITIAL FEED | 1 U | 2 V | 3 V | 4 V | 5 V | 6 U | 7 U | 8 V | 9 V | FINAL FEED |
| VARIATION, % | | 98.9 | 98.8 | 98.9 | 98.8 | 98.8 | 98.8 | 98.7 | 98.7 | 98.8 | |
| MW | 844. | 361. | 365. | 370. | 390. | 404. | 396. | 410. | 408. | 407. | 850. |
| VARIATION, % | | 57.4 | 56.9 | 56.3 | 54.0 | 52.3 | 53.2 | 51.6 | 51.8 | 52.0 | |
| SULPHUR, % | 3.77 | 1.04 | 1.32 | 1.04 | 1.20 | 1.24 | 1.22 | 1.32 | 1.30 | 1.24 | 3.98 |
| SEPARATION, % | | 73.2 | 65.9 | 73.2 | 69.0 | 68.0 | 68.5 | 65.9 | 66.5 | 68.0 | |
| VANADIUM, ppm | 114.0 | 2.5 | 2.5 | 2.5 | 2.5 | 2.5 | 2.5 | 2.5 | 2.5 | 3.0 | 118.0 |
| SEPARATION, % | | 97.8 | 97.8 | 97.8 | 97.8 | 97.8 | 97.8 | 97.8 | 97.8 | 97.4 | |
| NICKEL, ppm | 35.0 | 0.5 | 0.6 | 0.5 | 0.6 | 0.6 | 0.6 | 1.0 | 0.8 | 0.8 | 36.0 |
| SEPARATION, % | | 98.6 | 98.3 | 08.6 | 98.3 | 98.3 | 98.3 | 97.2 | 97.7 | 97.7 | |
| NITROGEN, g/l | 16.23 | 1.66 | 1.61 | | | | 1.71 | | 1.81 | | 16.23 |
| SEPARATION, % | | 89.8 | 90.1 | | | | 89.5 | | 88.9 | | |

In the following Table XIX the feed was Carbonate Trend Bitumen from the test described in Table XVIII after removal of 50% of the feed as permeate. The now concentrated feed was fed at a flow rate of 0.02 kg/s, at a temperature of 35° C., and a pressure between 2.0 MPa to 3.5 MPa on the retentate side of the membranes. The volume of oil used was 4.0 liters having a mean viscosity of 392.5 mPa·s at 35° C.

TABLE XIX

| | | MEMBRANES IN SERIES FLOW | | | | | | | | | |
|---|---|---|---|---|---|---|---|---|---|---|---|
| MEMBRANE | INITIAL FEED | 1 U | 2 V | 3 V | 4 V | 5 V | 6 U | 7 U | 8 V | 9 V | FINAL FEED |
| PRESSURE, MPa | | 3.36 | 3.09 | 2.95 | 2.82 | 2.68 | 2.55 | 2.41 | 2.27 | 2.14 | |
| FLUX, kg/m² day | | 16.7 | 6.1 | 11.6 | 12.9 | 19.5 | 24.9 | 17.2 | 17.4 | 16.5 | |
| VISCOSITY, mPa.s | 209.10 | 1.18 | 1.28 | 1.32 | 1.56 | 1.64 | | 1.81 | 1.88 | 1.93 | 576.00 |
| VARIATION, % | | 99.7 | 99.7 | 99.7 | 99.6 | 99.6 | | 99.5 | 99.5 | 99.5 | |
| MW | 879. | 370. | 409. | 396. | 425. | 450. | 453. | 465. | 470. | 469. | 900. |
| VARIATION, % | | 58.4 | 54.0 | 55.5 | 52.2 | 49.4 | 49.1 | 47.7 | 47.2 | 47.3 | |
| SULPHUR, % | 4.29 | 1.42 | 1.96 | 1.47 | 1.59 | 1.92 | 1.98 | 1.91 | 2.00 | 1.87 | 4.67 |
| SEPARATION, % | | 68.3 | 56.3 | 67.2 | 64.5 | 57.1 | 55.8 | 57.4 | 55.4 | 58.3 | |
| VANADIUM, ppm | 133.0 | 2.50 | 5.3 | 2.5 | 3.1 | 3.5 | 3.4 | 3.9 | 5.3 | 5.0 | 136.0 |
| SEPARATION, % | | 98.1 | 96.1 | 98.1 | 97.7 | 97.4 | 97.5 | 97.1 | 96.1 | 96.3 | |
| NICKEL, ppm | 41.0 | 0.9 | 1.8 | 1.2 | 1.6 | 2.0 | 1.8 | 1.8 | 2.5 | 2.1 | 41.0 |
| SEPARATION, % | | 97.8 | 95.6 | 97.1 | 96.1 | 95.1 | 95.6 | 95.6 | 93.9 | 94.9 | |
| NITROGEN, g/l | 13.08 | 2.31 | 2.11 | | | | 2.54 | | 2.81 | | 13.08 |
| SEPARATION, % | | 82.3 | 83.90 | | | | 80.6 | | 78.5 | | |

In the following Table XX the feed was Athabasca Bitumen from the hot water extraction process with a dilution of 37% with naphtha fed at a flow rate of 0.100 kg/s, at a temperature of 35° C., and a pressure between 2.0 MPa and 2.5 MPa on the retentate side of the membranes. The volume of oil used was 6.5 liters having a mean viscosity of 21.9 mPa·s at 35° C.

TABLE XX

| | | MEMBRANES IN SERIES FLOW | | | | | | | | | |
|---|---|---|---|---|---|---|---|---|---|---|---|
| MEMBRANE | INITIAL FEED | 1 U | 2 V | 3 V | 4 V | 5 V | 6 U | 7 U | 8 V | 9 V | FINAL FEED |
| PRESSURE, MPa | | 2.45 | 2.36 | 2.32 | 2.27 | 2.23 | 2.18 | 2.14 | 2.09 | 2.05 | |
| FLUX, kg/m² day | | 62.8 | 17.0 | 15.4 | 46.2 | 109.3 | 161.3 | 133.9 | 113.0 | 86.5 | |
| VISCOSITY, mPa.s | 19.20 | 1.12 | 1.22 | 1.21 | 1.23 | 1.32 | 1.32 | 1.37 | 1.42 | 1.35 | 24.60 |
| VARIATION, % | | 94.9 | 94.4 | 94.5 | 94.0 | 94.0 | 94.0 | 93.7 | 93.5 | 93.84 | |
| MW | 797. | 400. | 416. | 417. | 423. | 443. | 443. | 451. | 467. | 451. | 807. |
| VARIATION, % | | 50.1 | 48.1 | 48.0 | 47.3 | 44.8 | 44.8 | 43.8 | 41.8 | 43.8 | |
| SULPHUR, % | 3.24 | 1.29 | 1.32 | 1.50 | 1.32 | 1.50 | 1.37 | 1.41 | 1.48 | 1.45 | 3.32 |
| SEPARATION, % | | 60.7 | 59.8 | 54.3 | 59.8 | 54.3 | 58.2 | 57.0 | 54.9 | 55.8 | |
| VANADIUM, ppm | 99.0 | 1.8 | 1.8 | 2.1 | 1.8 | 2.3 | 1.8 | 1.8 | 3.6 | 2.7 | 105.0 |
| SEPARATION, % | | 98.2 | 98.2 | 97.9 | 98.2 | 97.7 | 98.2 | 98.2 | 96.5 | 97.3 | |
| NICKEL, ppm | 32.0 | 1.0 | 1.0 | 1.0 | 1.0 | 1.4 | 1.0 | 1.2 | 1.8 | 1.6 | 33.0 |
| SEPARATION, % | | 96.9 | 96.9 | 96.9 | 96.9 | 95.7 | 96.9 | 96.3 | 94.5 | 95. | |
| NITROGEN, g/l | 14.22 | 1.99 | 4.42 | | | | 2.24 | | 2.54 | | 14.22 |
| SEPARATION, % | | 86.0 | 68.9 | | | | 84.3 | | 82.2 | | |

In the following Table XXI the feed was Athabasca Bitumen concentrate from the test of Table XX after removal of 3.0 liters of permeate, fed at a flow rate of 0.025 kg/s at, a temperature of 34° C., and a pressure between 2.0 MPa and 2.7 MPa on the retentate side of the membranes. The volume of oil used was 3.5 liters having a mean viscosity of 122.8 mPa·s at 34° C.

TABLE XXI

| | | MEMBRANES IN SERIES FLOW | | | | | | | | | |
|---|---|---|---|---|---|---|---|---|---|---|---|
| MEMBRANE | INITIAL FEED | 1 U | 2 V | 3 V | 4 V | 5 V | 6 U | 7 U | 8 V | 9 V | FINAL FEED |
| PRESSURE, MPa | | 2.64 | 2.51 | 2.45 | 2.38 | 2.32 | 2.25 | 2.19 | 2.13 | 2.06 | |
| FLUX, kg/m² day | | 30.0 | 5.8 | 5.5 | 8.3 | 25.5 | 40.3 | 28.6 | 24.4 | 21.5 | |
| VISCOSITY, mPa.s | 95.14 | 1.60 | | 1.71 | 1.94 | 2.06 | 2.09 | 2.26 | 2.19 | 2.12 | 150.10 |

TABLE XXI-continued

| MEMBRANE | INITIAL FEED | MEMBRANES IN SERIES FLOW | | | | | | | | | FINAL FEED |
| --- | --- | --- | --- | --- | --- | --- | --- | --- | --- | --- | --- |
| | | 1 U | 2 V | 3 V | 4 V | 5 V | 6 U | 7 U | 8 V | 9 V | |
| VARIATION, % | | 99.4 | | 99.4 | 99.3 | 99.3 | 99.3 | 99.2 | 99.2 | 99.2 | |
| MW | 894. | 438. | 453. | 442. | 462. | 486. | 466. | 477. | 479. | 467. | 888. |
| VARIATION, % | | 50.8 | 49.2 | 50.4 | 48.1 | 45.5 | 47.7 | 46.5 | 46.2 | 47.6 | |
| SULPHUR, % | 3.82 | 1.54 | 1.87 | 1.78 | 1.67 | 1.76 | 1.75 | 2.02 | 1.82 | 2.11 | 3.94 |
| SEPARATION, % | | 60.3 | 51.8 | 54.1 | 57.0 | 54.6 | 54.9 | 47.9 | 53.1 | 45.6 | |
| VANADIUM, ppm | 124.0 | 2.2 | 3.0 | 3.5 | 1.8 | 3.3 | 2.4 | 4.4 | 4.1 | 4.1 | 128.0 |
| SEPARATION, % | | 98.3 | 97.6 | 97.2 | 98.6 | 97.4 | 98.1 | 96.5 | 96.7 | 96.7 | |
| NICKEL, ppm | 39.0 | 1.3 | 1.2 | 1.8 | 1.8 | 2.0 | 1.8 | 2.3 | 2.2 | 2.3 | 40.0 |
| SEPARATION, % | | 96.7 | 97.0 | 95.4 | 95.4 | 94.9 | 95.4 | 94.2 | 94.4 | 94.2 | |
| NITROGEN, g/l | 18.99 | 2.79 | 2.89 | | | | 3.01 | | 3.39 | | 18.99 |
| SEPARATION, % | | 85.3 | 84.8 | | | | 84.1 | | 82.1 | | |

The tests showed that when the microporous structure provided an outer layer on the retentate side with an initial molecular weight cut off of about 20,000 when measured in aqueous media, stable high fluxes could be maintained, for membranes 5V to 8V.

The tests further showed that when the microporous structure provided the outer layer on the retentate side with an initial molecular weight cut off much greater than about 20,000 when measured in an aqueous medium, as for membrane 9V, the microporous structure was more susceptible to plugging giving lower separation factors for the constituents and lower permeate fluxes. The test results also indicated that using feeds having higher viscosities than those given in the Tables would give larger pressure drops (on the retentate side of the membrane) with the equipment used, causing more difficult pumping of hydrocarbon past the membrane which in turn would give lower permeation rates, and so the viscosities would have to be decreased for higher recoveries of the upgraded oil. The viscosity may be reduced by heating the oil or by adding a recoverable solvent, such as naphtha or hydrocarbon concentrates, such as those obtained from natural gas, provided that they are mainly aliphatic in nature. Higher viscosities could be accommodated by equipment with larger spacings on the retentate side of the membrane and by the use of larger pipe sizes in the construction of the equipment.

It was also evident from the tests that a retentate obtained from a fossil derived aliphatic hydrocarbon liquid by the present invention may be enriched with at least one inorganic substance selected from groups IIA, IVA, VA, VIA, VIIA, VIIIA, IB, IIB, IIIB, IVB, VB and VIB of the Periodic Table as specified by the International Union of Pure and Applied Chemistry. Important inorganic substances included in this list and demonstrated to be separable in the previous examples are nitrogen, sulphur, aluminum, chromium, copper, nickel and vanadium which are not removable by known processes. These substances may be removed together with, for example, boron, nickel, titanium, zinc, lead, iron, nitrogen, silicon, phosphorus, magnesium, calcium and sulphur.

In the case of oil from oil shale or bitumen from tar sands, organic substances such as polyaromatic hydrocarbons, e.g. asphaltenes gums and waxes, may also be retained in the retentate obtained by the present invention.

As previously stated, these tests suggested that the pore size distribution of the polysulfone membranes used in the tests was being altered in some fashion by the hydrocarbon liquid being filtered, and so the following tests were made to investigate the effects of various liquids on the pore structure of polysulfone membranes.

In order to quantity the changes in membrane structure caused by operation in various liquid environments, a simple model was developed.

The basic assumptions of the model were
(1) cylindrically shaped pores of length L,
(2) steady, fully developed laminar flow in the pore,
(3) a log-normal distribution of pore sizes, with geometric mean diameter, $\bar{d}_p$, and geometric standard deviation, $\sigma_g$,
(4) pores less than a certain diameter, a, were considered too small for liquid molecules to pass through.

Considered too small for liquid molecules to pass through.

The resulting equation for membrane flux was $$\frac{W_T}{A_T} = N_p \rho \left(\frac{\pi \bar{d}_p^2}{4}\right)\left(\frac{\Delta P \bar{d}_p^2}{32 \mu L}\right)\exp(8\ln^2 \sigma_g) \times \tfrac{1}{2}\,\mathrm{erfc}\left\{\frac{\ln a - \ln \bar{d}_p}{\sqrt{2}\,\ln\sigma_g} - 2\sqrt{2}\,\ln\sigma_g\right\} \quad (1)$$

where $W_T$ was the mass flowrate for area $A_t$, $N_p$ the number of pores per unit of membrane area, $\rho$, the density and $\mu$, the viscosity of the fluid, and $\Delta P$ the transmembrane pressure.

This equation showed that the flux could be expressed in terms of the pore area and average fluid velocity for the average pore diameter with a correction term to account for the spread of the distribution. The complementary error function term would be approximately 2 provided its argument was less than $-2$. The term $2\sqrt{2}\ln \sigma_g$ was approximately 2 for $\sigma_g = 2$, the anticipated value for this parameter, and for these ultrafiltration membranes, where $\bar{d}_p$ was considerably greater than a, the term $$\frac{\ln a - \ln \bar{d}_p}{\sqrt{2}\,\ln\sigma_g}$$

was also negative. This allowed for simplification of equation (1) to $$\frac{W_T}{A_T} = N_p \rho \left(\frac{\pi \bar{d}_p^2}{4}\right)\left(\frac{\Delta P \bar{d}_p^2}{32 \mu L}\right)\exp(8\ln^2 \sigma_g) \quad (2)$$

$N_p$, could be established by setting the total pore area equal to a fixed percentage of the total membrane surface.

R. E. Kesting, Synthetic Polymer Membranes, McGraw-Hill, New York, 1971, chapter 5, and H. Ohya et al, A Study on Pore Size Distribution of Modified Ultrafiltration Membranes, J. Appl. Polym. Sci., 18, 1855, (1974) suggest that this percentage should be in the range of 1-2. Choosing a value of 1%, $N_p$ was found by solving the equation $$.01 = \int_{-\infty}^{\infty} N_p \left( \frac{\pi d_p^2}{4} \right) f(d_p) d(\ln d_p) \tag{3}$$

which led to $$N_p = \frac{\exp(-2\ln^2 \sigma_g)}{100 \left( \frac{\pi \bar{d}_p^2}{4} \right)} \tag{4}$$

Substituting equation (4) into equation (2) and solving for $\sigma_g$ produced the result $$\sigma_g = \exp\left[ \sqrt{\frac{1}{6} \ln\left( \frac{3200 \, W_T \mu L}{\rho A_T \Delta P \bar{d}_p^2} \right)} \right] \tag{5}$$

Membranes, free of adsorbed aliphatic hydrocarbon liquids, were tested in a scale unit, using apparatus essentially of the type shown in FIG. 1, but having a plurality of cells 16, FIG. 1, in series. Characterization of the membranes was carried out using poly (ethylene glycol)s and dextrans of various molecular weights in aqueous solution. The results of these experiments were used to establish values for the parameters of the pore size distribution.

FIGS. 4 and 5 show test results for a U20 membrane and; FIG. 4 shows the productivity (g/hr) plotted against the molecular weight of the solute, and FIG. 5 shows the % separation plotted against the molecular weight of the solute. Plots of separation versus molecular size of the solute would be instructive for determining pore sizes of the membranes. Data necessary to calculate Stokes radii for a series of sugars and poly (ethylene glycol)s, dextrans and polyvinyl pyrrolidone were taken from the literature. A simple relationship between Stokes radius and molecular weight was found with $$r_{st}(Å) = 0.228 \, MW^{0.5206} \tag{6}$$

FIG. 6 shows a plot of % separation versus Stokes radius of the solute for a U20.

In order to utilize equation (2), estimates of L and $\bar{d}_p$ had to be provided. Photomicrographs of asymmetric membranes from several sources suggested that the skin layer was 2 to 5 μm thick. The pressure was considered to be applied across this layer. A value of 2.5 μm was selected for L. The molecular weight for 50 percent separation was identified from a % separation-molecular weight curve (similar to FIG. 5). Using equation (6), this molecular weight was converted to a Stokes radius and $\bar{d}_p$ was chosen as three times this value. This somewhat arbitrary choice was based on the assumption that a molecule can only pass through a pore larger than 1½ times its diameter. Values for a, the size of a pore through which the solvent cannot flow, were estimated from equation 6 as three times the calculated Stokes radius of the liquid. The complementary error function term was virtually equal to two for all cases experienced in these tests, justifying the use of the simplified equation (2).

Data for water permeability at 20° C. was used with equation (5) to determined $\sigma_g$. The number of pores per unit of membrane area was evaluated from equation (4). Table XXII presents values of $\bar{d}_p$, $\sigma_g$ and $N_p$ obtained for the membranes used in this study. The average pore size was seen to decrease with increasing polymer concentration as indicated by the series U16, U18 and U20.

TABLE XXII

| Membrane Designation | Membrane Porosity Parameters | | | |
| --- | --- | --- | --- | --- |
| | MW at 50% Separation | $\bar{d}_p$ (Å) | $\sigma_g$ (Å) | $N_p$ (m$^{-2}$) |
| R 18 | 6000 | 63.4 | 2.003 | $1.21 \times 10^{14}$ |
| U 16 | 30000 | 146.5 | 1.577 | $3.92 \times 10^{13}$ |
| U 18 | 20000 | 118.6 | 1.697 | $5.17 \times 10^{13}$ |
| U 20 | 5000 | 57.7 | 2.071 | $1.33 \times 10^{14}$ |
| V 18 | 18000 | 112.3 | 1.766 | $5.28 \times 10^{13}$ |

Once the aqueous characterization of the membranes was completed, the membranes were solvent exchanged with ethanol. Reagent grade normal alcohols and paraffins were used in this study. A similar solvent exchange procedure was followed for all solvents tested. The permeation rate was measured for these various liquids at temperatures of 20, 30 and 40° C.

FIG. 7 shows a graph of the product flux (g/hr) and kinematic viscosity as a function of the carbon number for aliphatic alcohols for U20 membranes of Table XXII.

Fluxes for aliphatic alcohols were found to be greater than expected based on a kinematic viscosity correction of the water permeabilities. FIG. 7 shows that the trend in the data indicates a structural change in the membrane resulting in a more open pore structure occurs with essentially pure, lower, aliphatic alcohols. It is likely that introduction of absolute ethanol resulted in dehydration of the polysulfone membrane and subsequent shrinking of the polymer in the membrane, opening the pores and producing a membrane with higher flux. This effect is more pronounced at higher temperatures due to the increased mobility of alcohol and water molecules. Once the membrane was altered in this way, performance for an alcohol with higher carbon number was very similar indicating no further effect on the membrane structure. As well, the effect of temperature was less dramatic for alcohols with carbon number greater than two. This unexpected result was thought to have obvious consequences for processes where separations of alcohol solutions were contemplated. Performance based on aqueous characterization was likely to be incorrectly predicted due to the postulated enlargement of membranes pores.

FIG. 8 shows a graph of the product of flux (9/hr) and kinematic viscosity as a function of the carbon number of aliphatic hydrocarbons in the form of paraffinic hydrocarbons for U20 membranes of Table XXII.

The paraffinic hydrocarbons (i.e. aliphatic hydrocarbon liquids) displayed lower fluxes than would be expected from a consideration of kinematic viscosity differences as presented in FIG. 8. This effect was found to be due to swelling of the polymer in an aliphatic hydrocarbon environment. As the chain length of the paraffin increased above ten, a decline in the flux was found to occur due to the physical adsorption of the hydrocarbon chain on the membrane surface combined with an increasing reduction of mobility of adsorbed hydrocarbon species with increasing carbon number. These effects were seen to be, to some extent, temperature dependent with performance for longer chain molecules being less affected by temperature changes. These observations were found to aid in interpreting the results obtained during earlier studies of oil upgrading. It was apparent that aqueous characterization of these membranes underestimated their ability to perform separation in hydrocarbon media in an analogous but opposite way than in alcoholic media, described earlier.

It was assumed that the effect of the liquids on the membrane was only to alter the average pore size, leaving $\sigma_g$ and L unchanged. This effect was quantified by changes in $\bar{d}_p$ given by a rearrangement of equation (2).

$$\bar{d}_p = \sqrt[4]{\frac{128\ W_T\mu}{\pi\rho A_T\Delta P N_p}\ L\exp(-8\ln^2\sigma_g)} \quad (7)$$

Because of the approach adopted to estimate $\sigma_g$ and L, their actual values were scaling factors and were unimportant as the term $L\exp(-8\ln^2\sigma_g)$ was the same regardless of the assumed values.

FIG. 9 shows a graph of the calcuated average pore size (Angstroms) plotted against the carbon number of aliphatic hydrocarbons in the form of paraffinic hydrocarbons for U20 membranes of Table XXII. Experimental fluxes of aliphatic hydrocarbons in the form of paraffinc hydrocarbons were used with equation (7) and properly estimates from the literature to calculate average pore sizes for hydrocarbon operating conditions. FIG. 9 presents results of this type for the U20 membrane at 20° C. As expected from consideration of the flux results, aliphatic hydrocarbons caused a decrease in pore size due to polymer swelling. Values of $\bar{d}_p$ showed an increase with temperature, presumably due to thermal expansion of the polymer material although this effect was of a secondary nature. The resulting shift of the % separation-molecular weight curve was estimated from these calculated pore sizes to give a quantitative idea of the effect on performance. Table XXIII presents values calculated by dividing average pore size by three and solving equation 7 for molecular weight. The ability of these membranes to separate hydrocarbons at much lower molecular weights than expected from aqueous characterizaton was clearly due to the swelling phenomenon.

TABLE XXIII

Variation of MW at 50% Separation for Membrane U 20 at 20° C.

| Solvent | MW at 50% Separation |
| --- | --- |
| water | 5000 |
| n-hexane | 3897 |
| n-decane | 3578 |
| n-dodecane | 2964 |
| n-tetradecane | 2468 |

Now that the present invention has been described in detail, the relevance of some of the patents mentioned in the preamble will be discussed.

The previously mentioned Funk et al patent discloses a process for removing substances from hydrocarbon liquids using a microporous organic polymer membrane. Funk et al merely addresses the problem of removing light hydrocarbon solvents from a mixture of the solvents and deasphalted crude oil.

In the present invention, oil depleted, for example, in nitrogen, sulphur, nickel, aluminum, chromium, copper, vanadium and asphaltenes permeates the membrane, whereas in the previously mentioned Funk et al patent, it is the solvent present in the oil that permeates the membrane. Funk et al, column 1, line 40, states the solvent to oil ratio as 4:1 to 10:1, and the solvents are specified as having 3-7 carbon atoms, column 1, lines 31-35, which are very low molecular weight hydrocarbon solvents and are apparently removable by Funk et al using relatively larger pore sizes than those defined in the applicants' process. The larger molecular weight cut off membranes proposed by Funk et al would also pass larger molecules than the applicants' membranes and so removal by them of low molecular weight hydrocarbons would not occur. In contrast the applicants' invention removes not only high molecular weight hydrocarbons e.g. asphaltenes, but also relatively more polar impurities (inorganics) because of the relatively smaller molecular weight cut off pore size of less than about 4,000, when measured in hydrocarbon liquid, when the membrane is produced by the aliphatic hydrocarbon liquid swelling of the polysulfone membrane.

Applicants' process defines the microporous membrane as being alphatic hydrocarbon liquid swellable and initially having a molecular weight cut off of less than about 20,000 for an aqueous medium. Such membranes are not provided by the process taught by Funk et al.

Thus where in column 2, lines 5-8, Funk et al refers to the processing of heavy oil such as asphaltenes, this means recovering the solvent used in oil to precipitate the asphaltenes, and from which the asphaltenes have already been removed by, for example, centrifugal separation. This is confirmed by the Examples I, IV and the claims of Funk et al referring only to deasphalted crude. From this it will be seen that Funk et al does not provide a process for the removal of asphaltenes.

The polytetrafluoroethylene, polyethylene and polypropylene membranes of previously mentioned Audibert et al are so inert that it is not possible to produce at least an outer layer on them having a molecular weight cut off initially of less than about 20,000, measured in an aqueous medium, or one capable of being swelled in an aliphatic hydrocarbon liquid to have a molecular weight cut off of less than about 4,000 when measured in hydrocarbon liquid.

We claim:

1. A method for the molecular filtration of a predominantly aliphatic hydrocarbon liquid, comprising,
   (a) selecting a membrane having at least an outer layer on the high pressure thereof in the form of a microporous membrane of an aliphatic hydrocarbon liquid swellable, polysulfone compound, the whole of the membrane having been gelled in an aqueous gelation liquid, the microporous membrane being manufactured and maintained substantially free of any adsorbed aliphatic hydrocarbon liquid and having a molecular weight cut off of less than about 20,000, when measured in an aqueous medium, (b) contacting the outer layer on the high pressure side of the membrane with an aliphatic hydrocarbon liquid until the outer layer has swelled to have a molecular weight cut off of less than about 4,000, when measured in hydrocarbon liquid, then (c) passing the predominantly, aliphatic hydrocarbon liquid, at a viscosity of less than about 600 centipoise and at a pressure differential in the range of about one atmosphere to about 100 atmospheres (i.e. 0.1 to 10.0 MPa), across and in contact with the swelled outer layer on the high pressure side of the membrane so that predominantly aliphatic hydrocarbon liquid depleted in at least one substance permeates the said membrane, and (d) removing the predominantly aliphatic hydrocarbon liquid permeate, depleted in the said at least one substance, from the membrane.

2. A method according to claim 1, wherein the predominantly aliphatic hydrocarbon liquid of step (b) is the predominanly aliphatic hydrocarbon liquid of step (c).

3. A method according to claim 1, wherein the membrane is selected to have at least an outer layer on the high pressure side with a molecular weight cut off of less than about 10,000, when measured in an aqueous medium, prior to being contacted with the predominantly aliphatic hydrocarbon liquid.

4. A method according to claim 1, wherein at least a major portion of at least one substance selected from the group consisting of nitrogen, sulphur, aluminum, chromium, copper, nickel, vanadium and asphaltenes is removed by the molecular filtration from the predominantly aliphatic hydrocarbon liquid.

* * * * *